DEPOSITION OF NIOBIUM STANNIDE

Filed Dec. 28, 1964 Sheet 1 of 2

INVENTOR.
JOSEPH J. HANAK
BY
Glenn H. Bruestle
ATTORNEY

INVENTOR.
JOSEPH J. HANAK
BY
[signature]
ATTORNEY

United States Patent Office 3,420,707

Patented Jan. 7, 1969

3,420,707

DEPOSITION OF NIOBIUM STANNIDE

Joseph John Hanak, Trenton, N.J., assignor to Radio Corporation of America, a corporation of Delaware Filed Dec. 28, 1964, Ser. No. 421,528

U.S. Cl. 117—227 12 Claims

Int. Cl. C23c *11/00;* C23c *13/00*

ABSTRACT OF THE DISCLOSURE

A mass of niobium tin ($Nb_3Sn$) is positioned in a furnace and maintained at a first temperature in the range of about 800° to 1000° C. A substrate is positioned in a second furnace adjacent the first furnace, or in a second zone of the same furnace, and is maintained at a second temperature at least 50° C. higher than the first temperature. Preferably, the second temperature is in the range of about 900° to 1600° C. The substrate may be an insulator, a metallic alloy, a metal, or a semiconductor. The niobium tin mass is reacted with hydrogen chloride gas to form a mixture of hydrogen and nobium chloride and tin chloride vapors. This reaction is reversible, and the mixture thus formed reacts when heated in the vicinity of said substrate to the second or higher temperature to reform niobium tin, which deposits as a crystalline coating on the substrate. According to one embodiment, the coating is continuously deposited on a substrate consisting of an elongated flexible material such as a wire, ribbon, tape, or the like. The efficiency of the process may be improved by positioning a second mass of niobium tin immediately adjacent the substrate.

This invention relates to improved methods of making improved superconducting materials, and more particularly to improved methods of making improved superconducting niobium tin coatings on various substrates. This invention was made in the course of, or during an Air Force contract.

Description of the prior art

Superconducting materials are utilized to fabricate cryogenic devices, such as cryogenic switches which operate rapidly at low temperatures. Superconducting devices such as the cryotron have become increasingly important as computer elements. Superconducting materials are also utilized to fabricate coils for electro-magnets which develop strong magnetic fields while dissipating very little power. See, for example, T. G. Berlincourt, High Magnetic Fields by Means of Superconductors, British Journal Applied Physics, volume 14 page 749, 1963. The low temperatures necessary for the operation of cryogenic devices and magnets is generally provided by liquid helium.

The superconducting material niobium tin or niobium stannide, which preferably corresponds to the composition $Nb_3Sn$, has a critical temperature $T_c$ of about 18° K., which is the highest $T_c$ value for any superconductor presently available. Niobium tin also has a high critical magnetic field $H_c$ (the value of the magnetic field in which a superconducting material ceases to be superconducting). For a detailed discussion of $Nb_3Sn$ and its properties, see the September 1964 issue of RCA Review. Niobium tin can be synthesized by running molten tin over powdered niobium in a sealed quartz tube maintained at 1200° C. Alternatively, powdered or granulated niobium and tin can be mixed in appropriate proportions and sintered in a furnace boat. However, the material as ordinarily made by direct synthesis of the elements tends to be porous, chalky, and brittle, and does not have a metallic appearance or luster. The density of the prior art material is considerably below the theoretical maximum. It is very difficult to utilize such material in the fabrication of superconducting devices. Attempts have been made to fill a metal tube with powdered niobium and powdered tin, wind the tube into a coil, and heat the tube to sinter the powdered core into a compact mass of $Nb_3Sn$. As coils with many turns are required, such expedients are cumbersome, and have not hitherto been reported as successful in making powerful electro-magnets.

An improved vapor-phase method of preparing a superconducting niobium tin has been developed, consisting of the simultaneous reduction by hydrogen of the gaseous chlorides of niobium and tin on the surface of solid substrates at temperatures of about 900° to 1200° C. Chlorine gas is passed over sintered niobium tin to form the mixture of gaseous chlorides, and hydrogen is then added to the mixture. Visibly crystalline $Nb_3Sn$ deposits having a metallic luster and a density greater than 99% of the theoretical density of $Nb_3Sn$ have thus been prepared. For details, see J. J. Hanak, Vapor Deposition of $Nb_3Sn$, Metallurgy of Advanced Electronic Materials, Interscience Publishers, New York, 1963, pages 161–171. Superconducting material thus prepared is capable of carrying high currents at high magnetic fields, and has been utilized to fabricate a superconducting electro-magnet which produces a magnetic field of about 100,000 gauss. See, for example, E. R. Schrader et al., High-Field $Nb_3Sn$ Superconducting Magnets by Magnetic-Field Stabilization, Applied Physics Letters, vol. 4, page 105, Mar. 15, 1964. However, improvement is desirable in the rate at which $Nb_3Sn$ is deposited, so that the process can be scaled up for the rapid production of large amounts of superconducting material. Improvement is also desirable in the efficiency of the process, that is, in the ratio of $Nb_3Sn$ deposited to raw materials used.

Accordingly, it is an object of this invention to provide improved methods of fabricating improved superconducting materials.

Another object of this invention is to provide a more efficient method of rapidly depositing $Nb_3Sn$ coatings on substrates.

Summary of the invention

These and other objects are attained according to the invention by an improved method of depositing a crystalline coating of superconductive niobium tin on a substrate. The method comprises the steps of reacting hydrogen chloride gas with a mass of niobium tin at a first temperature so as to form vapors of niobium chloride and tin chloride; and heating the mixed vapors of niobium chloride and tin chloride in the proximity of a substrate at a second temperature higher than said first temperature, so that at least a portion of the mixed vapors is decomposed, and the metallic portions of the chlorides are deposited on the substrate as crystalline $Nb_3Sn$. According to one embodiment, the substrate is an elongated flexible material such as wire, ribbon, tape, and the like.

Brief description of the drawing

The invention will be described in greater detail by the following examples, considered in conjunction with the accompanying drawing, in which.

Description of the preferred embodiments

Example I

Figure 1:
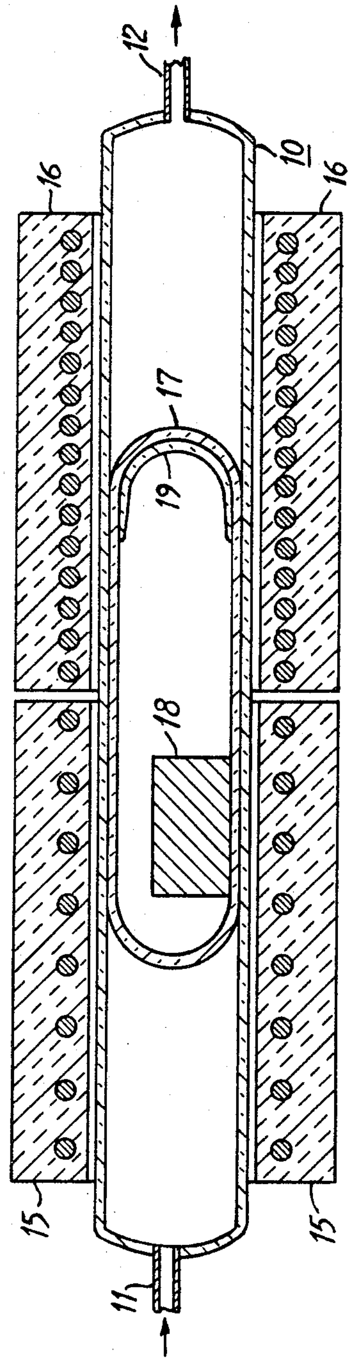
FIGURE 1 is a schematic diagram of apparatus useful in one embodiment of the invention.

The apparatus utilized in this embodiment comprises a refractory furnace tube 10 having an inlet 11 at one end, and an outlet 12 at the opposite end, as shown in FIGURE 1. The central portion of furnace tube 10 is surrounded by two adjacent furnaces 15 and 16, which may conveniently include electrical resistance heaters that can be individually controlled.

A sealed ampoule 17 serves as both the reaction chamber or tube and a substrate onto which niobium tin is to be deposited. In this example, the substrate 17 is an insulator such as glass, quartz, porcelain, forsterite, steatite, alumina, and the like. A mass of sintered $Nb_3Sn$ 18, which may be prepared according to the prior art by direct synthesis of the elements, is placed in one end of the ampoule 17 before it is sealed. The ampoule 17 is then flushed with hydrogen chloride gas, and is hermetically sealed, so that the atmosphere inside ampoule 17 consists of hydrogen chloride gas.

The sealed ampoule 17, thus prepared, is positioned inside furnace tube 10 so that the $Nb_3Sn$ mass 18 at one end of ampoule 17 is surrounded by one furnace 15, while the opposite end of ampoule 17 is surrounded by the second furnace 16. The first furnace 15 is set at a first temperature which is preferably in the range of about 800° to 1000° C. In this example, the temperature of the first furnace 15 is fixed at 800° C. The second furnace 16 which surrounds the opposite end of ampoule 17 is set at a second temperature at least 50° C. higher than the first temperature.

Suitably, the second furnace 16 is maintained at a temperature of about 900° to 1600° C. In this example, furnace 16 is maintained at about 1000° C. Throughout the following heating step, a flow of gas through the furnace tube 10 is maintained in the direction indicated by the arrows. The gas utilized is preferably hydrogen. The gas flow serves two purposes: it maintains an external pressure on the ampoule 17, and thus prevents the ampoule from breaking due to the expansion of the hydrogen chloride gas inside the ampoule during the heating step; when the ampoule consists of a material such as quartz, which may at elevated temperatures permit hydrogen to diffuse through, a flow of hydrogen through the furnace tube 10 prevents any possible loss of hydrogen through the walls of the ampoule 17.

The ampoule 17 is thus heated with its two ends in two separate temperature zones for about 5 days. During this period, the hydrogen chloride gas ambient inside the ampoule reacts with the $Nb_3Sn$ mass 18 in the low temperature region of ampoule 17 to form a mixture of niobium chloride vapors, tin chloride vapors, and hydrogen. This mixture diffuses into the high temperature region of ampoule 17, and reacts to reform $Nb_3Sn$. The ampoule is then cooled to room temperature and opened. A deposit 19 of lustrous visibly crystalline high density $Nb_3Sn$ about 0.7 mm. thick is formed under these conditions on that end of ampoule 17 which was maintained at the higher temperature, that is, at the end of ampoule 17 opposite the $Nb_3Sn$ mass 18.

Samples of $Nb_3Sn$ thus deposited were found on analysis to contain from 21.9 to 22.6 atomic percent tin. The critical temperature $T_c$ of the samples varied from about 13.7° K. to 15° K. X-ray diffraction analysis of these materials showed very sharp patterns of beta-tungsten structure which is characteristic of $Nb_3Sn$, and a complete absence of any additional phase.

A feature of this method is that the composition of the deposited coating may be simply and smoothly controlled by varying the temperature difference between the hot and cold regions of the ampoule. As the temperature difference is increased, the niobium content of the deposited coating increases. Alternatively, the composition of the deposited coating may be controlled by changing the composition of the sintered niobium tin mass 18 in the hot end of the ampoule.

Example II

The method described above may also be utilized to deposit a crystalline coating of high density niobium tin on a metal such as platinum, tantalum, molydenum, rhodium, and the like. In this example, the reaction tube 17 is a sealed platinum cylinder. The method described in Example I is utilized to deposit a superconductive visibly crystalline lustrous niobium tin coating on one end of the platinum cylinder 17. A metallic cylinder internally coated with $Nb_3Sn$ in this manner may be utilized at temperatures below the critical temperature of the coating as a low-loss wave guide or resonating cavity for microwaves.

Example III

The method of the invention may also be utilized in the same manner to deposit a coating of visibly crystalline high density niobium tin on a substarte consisting of a metallic alloy such as molybdenum-chromium alloys, rhodium-palladium alloys, tantalum alloys, and the like. In this example the substrate 17 is a rhodium-palladium alloy in the form of a sealed hollow pipe having a square cross section. A crystalline high density coating of niobium tin is deposited on the alloy by the embodiment of the invention described above in Example I. It will be understood that the term "metallic substrate" as used hereinafter includes both pure metals and alloys or mixtures of metals.

While in the previous examples, the ambient of hydrogen chloride gas was static, the method may also be modified to utilize a stream of hydorgen chloride gas flowing from the niobium tin charge to the substrate, as described in the following examples.

Although an insulating substrate was employed in Example I, and the metallic substrates in Examples II and III, the method may also be utilized to deposit a coating of crystalline high density $Nb_3Sn$ on an elemental semiconductor such as silicon, or on a semiconductive compound such as boron nitride, silicon carbide, or the like.

Example IV

Figure 2:
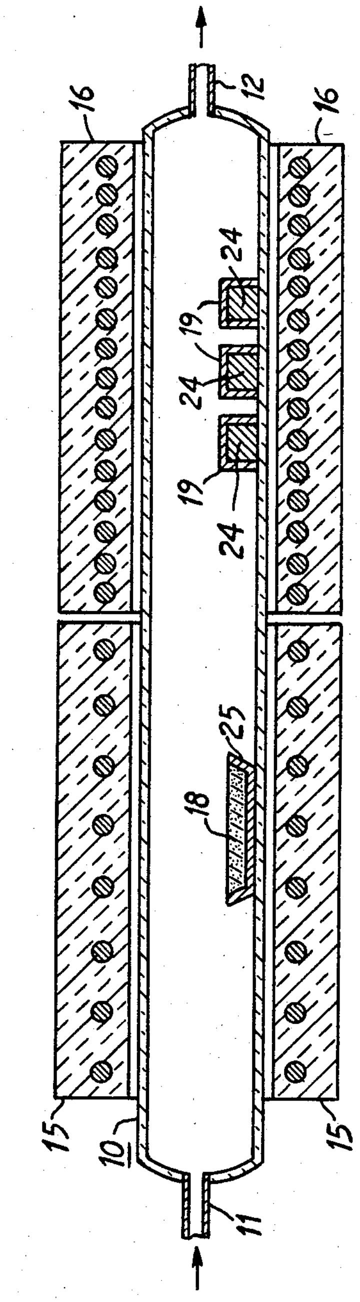
FIGURE 2 is a schematic diagram of apparatus useful in a second embodiment of the invention; and, FIGURE 3 is a schematic diagram of apparatus useful in a third embodiment of the invention.

In this embodiment, the apparatus utilized comprises a refractory furnace tube or chamber 10 (FIGURE 2) having an inlet 11 on one end, and an outlet 12 at the opposite end. The central portion of furnace tube 10 is surrounded by two adjacent furnaces 15 and 16. A single substrate may be coated, or a plurality of substrates may be simultaneously coated with $Nb_3Sn$. The latter practice is advantageous when it is desired that the niobium tin coating on a plurality of substrates be of uniform thickness. The substrates 24, which in this example are silicon plates, are positioned in furnace tube 10 adjacent to the outlet 12 in the region which is surrounded by furnace 16. A mass of sintered niobium tin 18 is placed in a furnace boat 25 and positioned within furnace tube 10 adjacent to the inlet 11 in the region which is surrounded by furnace 15.

Furnace tube 10 is first purged by flowing an inert gas such as helium or argon through the tube in the direction indicated by the arrows. In this example, furnace 15 is set at 1000° C., and furnace 16 is set at 1200° C. The flow of inert gas is ended, and hydrogen chloride gas is then passed through furnace tube 10 in the direction indicated by the arrows, so that the hydrogen chloride gas flows from the niobium tin charge 18 to the substrates 24.

Under these conditions, the reaction which takes place within the portion of tube 10 surrounded by furnace 15 may be represented by the equation:

$$14HCl+Nb_3Sn \rightarrow 3NbCl_4+SnCl_2+7H_2$$

This equation is the reverse of that desired in my above mentioned publication, Vapor Deposition of $Nb_3Sn$. When the mixture of vaporized niobium chloride, tin chloride and hydrogen, together with the unreacted hydrogen chloride gas, is swept into the high temperature region of the furnace tube, that is, the portion surrounded by furnace 16, the above reaction is reversed, and a high density visibly crystalline $Nb_3Sn$ coating is deposited on the substrates 24.

A feature of this and the next embodiment, which makes them particularly suitable for large scale manufacture, is that the deposition process may be controlled by varying only a single flow parameter, namely, the rate of flow of the hydrogen chloride gas. In the prior vapor phase process it is necessary to control not only the rate of flow of chlorine, but also the rate of flow of the hydrogen.

Example V

A high density crystalline superconductive $Nb_3Sn$ coating may be continuously deposited on an elongated flexible substrate such as a wire, tape, ribbon, and the like, by the embodiment next described. The filamentary material thus fabricated may be utilized to form superconductive coils.

Figure 3:
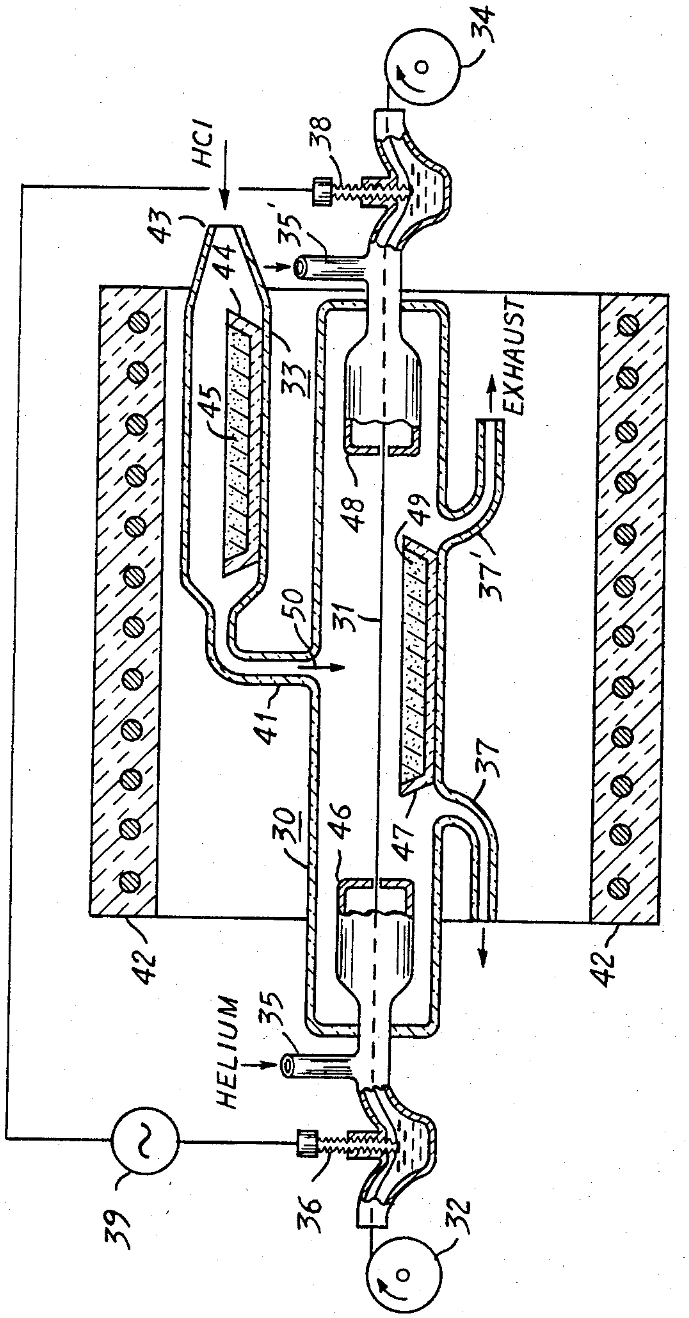

The apparatus employed in this example consists of a refractory furnace tube 30 (FIGURE 3) through which the flexible substrate to be coated is continuously fed. In this example, the flexible substrate 31 is a stainless steel ribbon. The bare ribbon is unrolled from one spool 32, and the coated ribbon is rolled up on another spool 34. The ribbon 31 enters the furnace tube 30 through a mercury-sealed electrode 36 and a restricted tube 46 at one end and leaves through another restricted tube 48 and mercury-sealed electrode 38 at the opposite end of furnace tube 30. The eletcrodes 36 and 38 are connected to a source 39 of alternating current power to thereby pass an alternating electrical current through that portion only of flexible substrate 31 which is within the furnace tube 30, and thus heat this portion only of the substrate to the desired temperature. Suitably the substrate 31 is thus heated to a temperature at least 50° C. above the temperature of furnace tube 30.

The furnace tube 30 includes a feed or delivery tube 33 attached to the central portion thereof; two inlet tubes 35 and 35' attached to tubes 46 and 48 respectively at opposite ends of furnace tube 30; and two outlet tubes 37 and 37' between the ends of furnace tube 30. The delivery tube 33 is connected at one end by a passageway 41 to the central portion of furnace tube 30. At the other end of delivery tube 33 is an inlet 43. The entire apparatus may be made of quartz or the like.

A furnace boat 44 containing a niobium tin mass 45 is positioned in the delivery tube 33. The niobium tin mass 45 may, for example, be the brittle porous material formed by direct synthesis of the elements as in the prior art mentioned above. Advantageously, a second furnace boat 47 containing a second niobium tin mass 49 is positioned in the central portion of furnace tube 30. The furnace tube 30, which also serves as the reaction chamber or tube, is surrounded by an electrical resistance furnace 42. Suitably, a temperature of about 650° to 1000° C. is maintained in the furnace tube 30 by the furnace 42.

The furnace tube 30 is purged by passing a stream of an inert gas such as helium or argon through inlets 35 and 35'. The carrier gas moves toward the center of reaction tube 30, and exits through outlets 37 and 37'. The flow of the inert carrier gas is maintained throughout the process, and serves to prevent the reaction components from coming in contact and reacting with the mercury-seals 36 and 38. After the furnace tube has been purged, the electrical furnace 42 is energized, and the furnace tube is brought up to a temperature within the range of about 650° to 1000° C. The flexible substrate 31 is passed through the furnace tube 30 in a direction indicated by the arrows on spools 32 and 34. An alternating current is passed through the mercury-sealed electrodes 36 and 38 so as to heat only that portion of the moving substrate 31 which is within the furnace tube 30 to a temperature at least 50° C. above the temperature of the furnace tube 30. A stream of dry hydrogen chloride gas is now passed into inlet 43 of delivery tube 33. The hydrogen chloride gas passes over the niobium tin mass 45 and reacts with it according to the equation in Example IV above. The mixed vapors of niobium chloride and tin chloride, the hydrogen formed in the reaction, and the unreacted hydrogen chloride gas, are swept through the passageway 41 into the furnace tube 30, which also serves as the reaction tube. The mixture of reactants thus enters furnace tube 30 as shown by the arrow 50 in a direction perpendicular to the direction of motion of the heated substrate 31. On the surface of the heated substrate 31, the reaction noted above is reversed, and a high density coating of crystalline $Nb_3Sn$ is deposited on the substrate.

The presence of the additional $Nb_3Sn$ mass 49 in furnace tube 30 immediately adjacent the moving flexible substrate 31 serves to maintain the concentration of niobium chloride and tin chloride vapors in the vicinity of the moving substrate at the desired values. Any unreacted components such as hydrogen chloride gas and metal chloride vapors pass out of furnace tube 30 by way of outlets 37 and 37'.

An important feature of this embodiment of the invention is that the niobium tin is deposited only on the flexible substrate 31, and not all on the walls of the furnace tube. If the niobium tin is permitted to deposit on the walls of the reaction tube 30, the tube and its passageways are eventually blocked. It then becomes necessary to halt the coating operation, and to clean reaction tube 30. The coating process thus becomes a discontinuous batch type process. In contrast, in the embodiment described, the operation is a continuous flow process, and the coating operation proceeds steadily without interruption for any desired length of the elongated flexible substrate.

Another feature of the invention is the improved nature of the $Nb_3Sn$ coating thus formed. The thickness of the coating may be varied from a few Angstroms to a number of millimeters. The coating deposited is visibly crystalline, non-porous, and has a metallic appearance and luster. Moreover, the coating is more dense than the $Nb_3Sn$ made according to the prior art by the direct synthesis of the elements. The theoretical density of $Nb_3Sn$, assuming a perfect crystal lattice, is about 8.92 grams per $cm.^3$. The density of sintered $Nb_3Sn$ made from the elements according to the prior art is only about 7.2 grams per $cm.^3$. In contrast, the density of the crystalline $Nb_3Sn$ deposited according to the invention is over 90% of the theoretical maximum limiting density.

It has unexpectedly been found that the efficiency of this embodiment of the invention is very high, and approaches 100%. Consistently, over 95% of the niobium chloride and tin chloride vapors formed in this embodiment react in the vicinity of the heated substrate to deposit a lustrous high density visibly crystalline niobium tin coating on the substrate. The cost of the coated substrate thus fabricated is therefore lower than similar coated substrates made by the prior art, wherein a substantial portion of the niobium chloride and tin chloride vapors remain unreacted and are wasted. It is believed that one of the reasons for the improved efficiency is the presence of the second $Nb_3Sn$ mass 49 immediately adjacent the moving substrate 31. Any portion of hydrogen chloride stream passed into delivery tube 33 which did not react with the first $Nb_3Sn$ mass 45 within delivery tube 33 now has a second chance to react with the second $Nb_3Sn$ mass 49. Moreover, since the reaction which takes place when an $Nb_3Sn$ coating is deposited on the substrate is represented by the equation $$3NbCl_4+SnCl_2+7H_2\rightarrow Nb_3Sn+14HCl$$

additional hydrogen chloride gas is formed in the immediate vicinity of the substrate. Since this hydrogen chloride gas tends to drive the reaction in the reverse direction, improved results are obtained by removing the hydrogen chloride thus formed from the reaction site. The second $Nb_3Sn$ mass 49 utilized in this embodiment serves as a sink for the hydrogen chloride thus generated, since the hydrogen chloride reacts with the $Nb_3Sn$ mass 49 to form an additional amount of niobium chloride and tin chloride vapors. The additional chloride vapors thus formed react in the immediate vicinity of the heated substrate to deposit more $Nb_3Sn$ and to reform hydrogen chloride, which again reacts with the $Nb_3Sn$ mass 49. There is thus a regenerative or "bounce" effect wherein the niobium chloride and tin chloride vapors react to deposit $Nb_3Sn$, forming hydrogen chloride as a by-product, and the hydrogen chloride thus formed reacts with the $Nb_3Sn$ mass 49 to produce additional niobium chloride and tin chloride vapors, and the cycle repeats itself. Very high efficiency is thereby attained for the process, so that very little of the expensive niobium is wasted.

Another advantage of this embodiment is that a turbulent flow ensues for the mixture of reactants in the furnace tube 30. This turbulent flow insures very good mixing of the reactants, and hence the composition of the deposited $Nb_3Sn$ is uniform.

Still another feature of this embodiment is that the deposition of the $Nb_3Sn$ takes place not just in a narrow region of substrate 31 adjacent passageway 41, but over a region at least as long as the second $Nb_3Sn$ mass 49. Deposition of an $Nb_3Sn$ coating over a substrate span of 20 inches was readily attained, and by increasing the length of the reaction tube 30 and the length of the $Nb_3Sn$ mass 49, the process can be scaled up for industrial production, so that deposition of the $Nb_3Sn$ takes place over a length of substrate measured in feet, or even in yards.

As in Example IV, the adjustable process parameters of this embodiment are the composition of the $Nb_3Sn$ masses utilized; the furnace temperature; the difference between the furnace temperature and the substrate temperature; and the rate of flow of the hydrogen chloride. As an example, a substrate consisting of a stainless steel ribbon 90 mils wide and 3 mils thick was given an $Nb_3Sn$ coating about 0.25 mil thick by passing the ribbon at the rate of 15 feet per hour through a furnace tube maintained at about 850° C., while electrically heating the portion of the ribbon within the furnace tube to a temperature of about 1050° C., and passing hydrogen chloride through the apparatus at the rate of about 180 $cm.^3$ per hour.

While the flexible substrate in this example was stainless steel, other alloys such as nickel-chromium alloys, tungsten-tantalum alloys, niobium-tantalum alloys, rhodium-palladium alloys, and the like may be utilized instead. Alternatively, the flexible substrate 31 may consist of a pure metal such as tungsten, tantalum, niobium, platinum, and the like.

The above examples are by way of illustration only, and not limitation. Other substrate materials and other forms of apparatus may be utilized. The process may utilize arrangements for continuously feeding granulated niobium tin into furnace boats 44 and 47. A single two-zone furnace may be employed instead of two separate furnaces. Various other modifications may be made without departing from the spirit and scope of the invention as set forth in this specification and the appended claims.

What is claimed is:

1. The method of depositing a coating of crystalline niobium tin on a substrate, comprising the steps of:

reacting hydrogen chloride gas with a mass of niobium tin at a first temperature to form hydrogen and mixed vapors of niobium chloride and tin chloride; and, heating only said hydrogen and mixed vapors of niobium chloride and tin chloride formed by said reaction, said heating being in the proximity of said substrate at a second temperature higher than said first temperature, so that at least a part of said vapors is decomposed, and the metallic portions thereof are deposited on said substrate as crystalline niobium tin.

2. The method of depositing a coating of crystalline niobium tin on a substrate, comprising the steps of:

reacting hydrogen chloride gas with a mass of niobium tin at a first temperature to form hydrogen and mixed vapors of niobium chloride and tin chloride; and, heating only said hydrogen and mixed vapors of niobium chloride and tin chloride formed by said reaction, said heating being in the presence of said substrate at a second temperature at least 50° C. higher than said first temperature, so that at least a part of said vapors is decomposed, and the metallic portions thereof are deposited on said substrate as crystalline niobium tin.

3. The method of depositing a coating of crystalline niobium tin on an insulating substrate, comprising the steps of:

reacting hydrogen chloride gas with a mass of niobium tin at a first temperature to form hydrogen and mixed vapors of niobium chloride and tin chloride; and, heating only said hydrogen and mixed vapors of niobium chloride and tin chloride formed by said reaction, said heating being in the presence of said substrate at a second temperature at least 50° C. higher than said first temperature, so that at least a part of said vapors is decomposed, and the metallic portions thereof are deposited on said substrate as crystalline niobium tin.

4. The method of depositing a coating of crystalline niobium tin on a metallic substrate, comprising the steps of:

reacting hydrogen chloride gas with a mass of niobium tin at a first temperature to form hydrogen and mixed vapors of niobium chloride and tin chloride; and, heating only said hydrogen and mixed vapors of niobium chloride and tin chloride formed by said reaction, said heating being in the presence of said substrate at a second temperature at least 50° C. higher than said first temperature, so that at least a part of said vapors is decomposed, and the metallic portions thereof are deposited on said substrate as crystalline niobium tin.

5. The method of depositing a coating of crystalline niobium tin on a semiconductive substrate, comprising the steps of:

reacting hydrogen chloride gas with a mass of niobium tin at a first temperature to form hydrogen and mixed vapors of niobium chloride and tin chloride; and, heating only said hydrogen and mixed vapors of niobium chloride and tin chloride formed by said reaction, said heating being in the presence of said substrate at a second temperature at least 50° C. higher than said first temperature, so that at least a part of said vapors is decomposed, and the metallic portions thereof are deposited on said substrate as crystalline niobium tin.

6. The method of depositing a coating of crystalline niobium tin on an elongated flexible substrate, comprising the steps of:

continuously passing said elongated substrate through a reaction chamber;

reacting a stream of hydrogen chloride gas with a mass of niobium tin at a first temperature to form hydrogen and mixed vapors of niobium chloride and tin chloride;

passing the stream of said hydrogen and said mixed niobium chloride and tin chloride vapors formed by said reaction, together with unreacted hydrogen chloride gas, into said reaction chamber; and, heating in said reaction chamber said substrate to a second temperature higher than said first temperature so that at least a part of said chloride vapors is decomposed and the metallic portions thereof are deposited on said substrate as a coating of niobium tin.

7. The method of depositing a coating of crystalline niobium tin on a flexible filamentary substrate, comprising the steps of:

continuously passing said flexible substrate through a reaction chamber;

reacting a stream of hydrogen chloride gas with a mass of niobium tin at a first temperature to form hydrogen and mixed vapors of niobium chloride and tin chloride;

passing the stream of said hydrogen and said mixed niobium chloride and tin chloride vapors formed by said reaction, together with unreacted hydrogen chloride gas, into said reaction chamber; and, heating in said reaction chamber said substrate to a second temperature higher than said first temperature so that at least a part of said chloride vapors is decomposed and the metallic portions thereof are deposited on said substrate as a coating of niobium tin.

8. The method of depositing a coating of crystalline niobium tin on an elongated flexible metallic substrate, comprising the steps of:

continuously passing said flexible substrate through a reaction tube;

reacting a stream of hydrogen chloride gas with a mass of niobium tin at a first temperature to form hydrogen and mixed vapors of niobium chloride and tin chloride;

passing the stream of said hydrogen and said mixed niobium chloride and tin chloride vapors formed by said reaction, together with unreacted hydrogen chloride gas, into said reaction tube; and, heating only the portion of said substrate in said reaction tube to a second temperature at least 50° C. higher than said first temperature so that at least a part of said chloride vapors is decomposed and the metallic portions thereof are deposited on said substrate as a coating of niobium tin.

9. The method of depositing a coating of crystalline niobium tin on an elongated flexible substrate, comprising the steps of:

reacting a stream of hydrogen chloride gas with a first mass of niobium tin at a first temperature to form hydrogen and mixed vapors of niobium chloride and tin chloride;

directing the stream of hydrogen and niobium chloride vapors and tin chloride vapors formed by said reaction, together with unreacted hydrogen chloride gas, into a reaction tube;

continuously passing said flexible substrate through said reaction tube; and, heating only the portion of said substrate in said reaction tube to a second temperature higher than said first temperature so that at least a part of said chloride vapors is decomposed and the metallic portions thereof are deposited on said substrate as a coating of niobium tin.

10. The method of depositing a coating of crystalline niobium tin on an elongated flexible substrate, comprising the steps of:

reacting a stream of hydrogen chloride gas with a first mass of niobium tin at a first temperature to form a mixture of hydrogen and vapors of niobium chloride and tin chloride;

directing said mixture of hydrogen, niobium chloride vapor, and tin chloride vapor formed by said reaction, together with unreacted hydrogen chloride gas, into a reaction tube containing a second mass of niobium tin;

continuously passing said elongated substrate through said reaction tube adjacent to said second niobium tin mass while continuously flowing an inert gas through said reaction tube; and, heating only the portion of said substrate in said reaction tube to a second temperature at least 50° C. higher than said first temperature so that at least a part of said chloride vapors is decomposed and the metallic portions thereof are deposited on said substrate as a coating of niobium tin.

11. The method as in claim 10, wherein said mixture of unreacted hydrogen chloride gas, niobium chloride vapors, tin chloride vapors, and hydrogen formed in said reaction, are directed into said reaction tube in a direction perpendicular to the direction of motion of said flexible substrate.

12. In the method of depositing a coating of crystalline niobium tin on a moving elongated flexible substrate by continuously passing said substrate through a reaction tube, passing into said reaction tube a mixture including hydrogen gas, niobium chloride vapors, and tin chloride vapors, and heating the portion of said substrate in said reaction tube to a temperature sufficient to decompose at least part of said chloride vapors and deposit a coating of niobium tin on said substrate, the improvement comprising increasing the efficiency of said deposition of niobium tin by maintaining a mass of niobium tin in said reaction tube adjacent said moving substrate.

References Cited

UNITED STATES PATENTS 3,268,362 8/1966 Hanak et al. ------- 117—107.2

OTHER REFERENCES

Cherry et al.: "Research on the Phenomena of Superconductivity in Metals and Alloys," Nos. 6–7, May 31, 1961 (pp. 5–10 relied on).

WILLIAM L. JARVIS, *Primary Examiner.*

U.S. Cl. X.R.

29—194; 117—107.1, 107.2